UNITED STATES PATENT OFFICE.

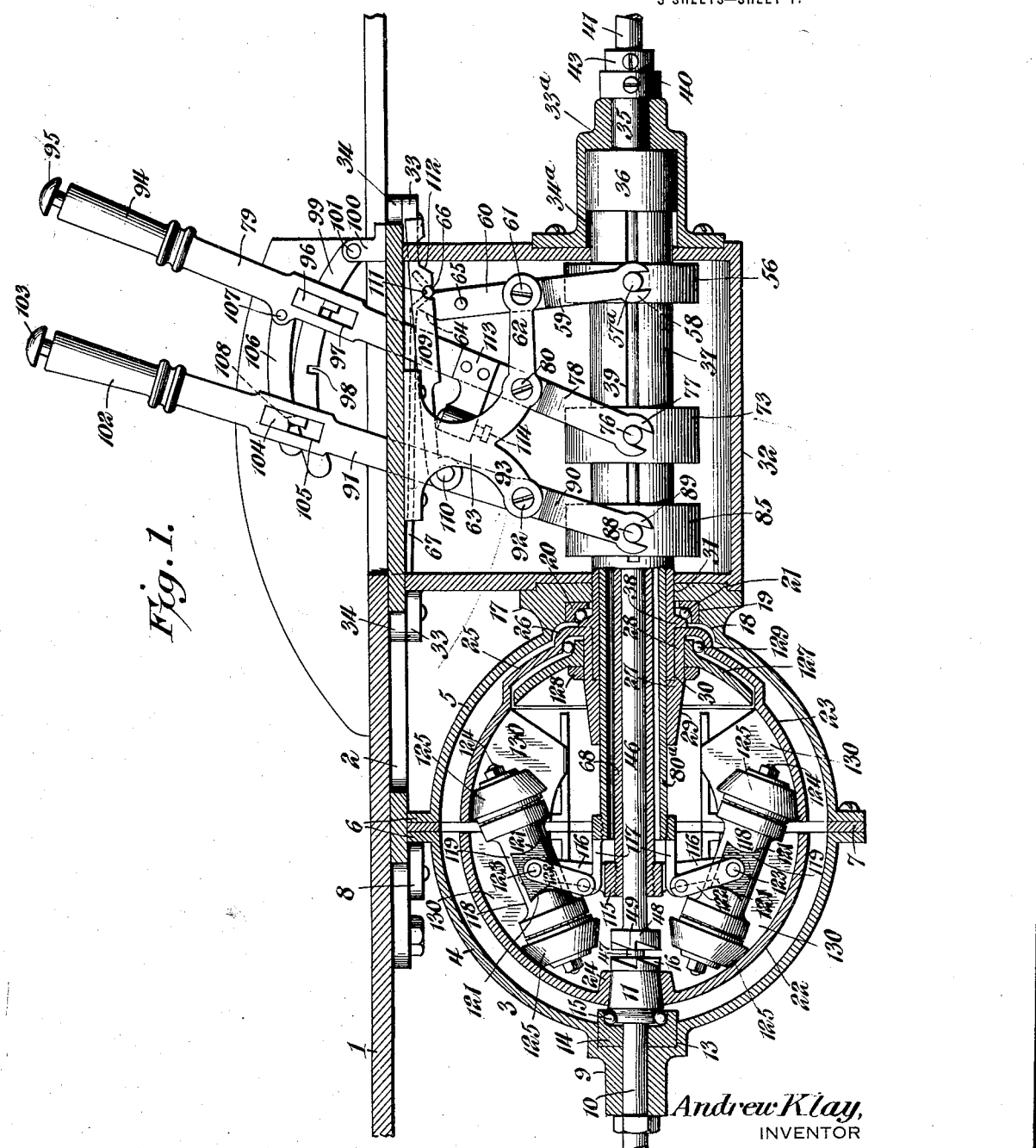

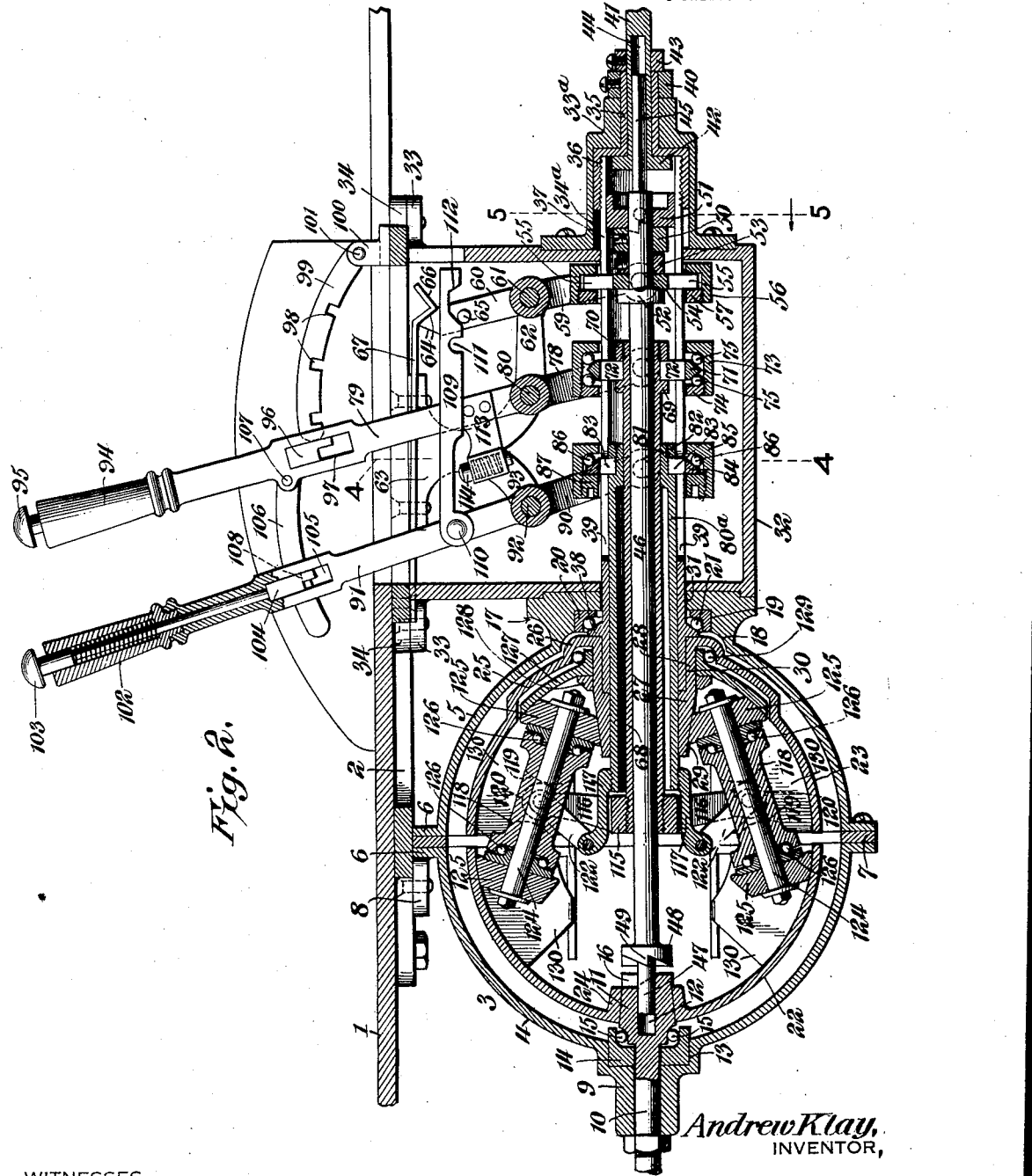

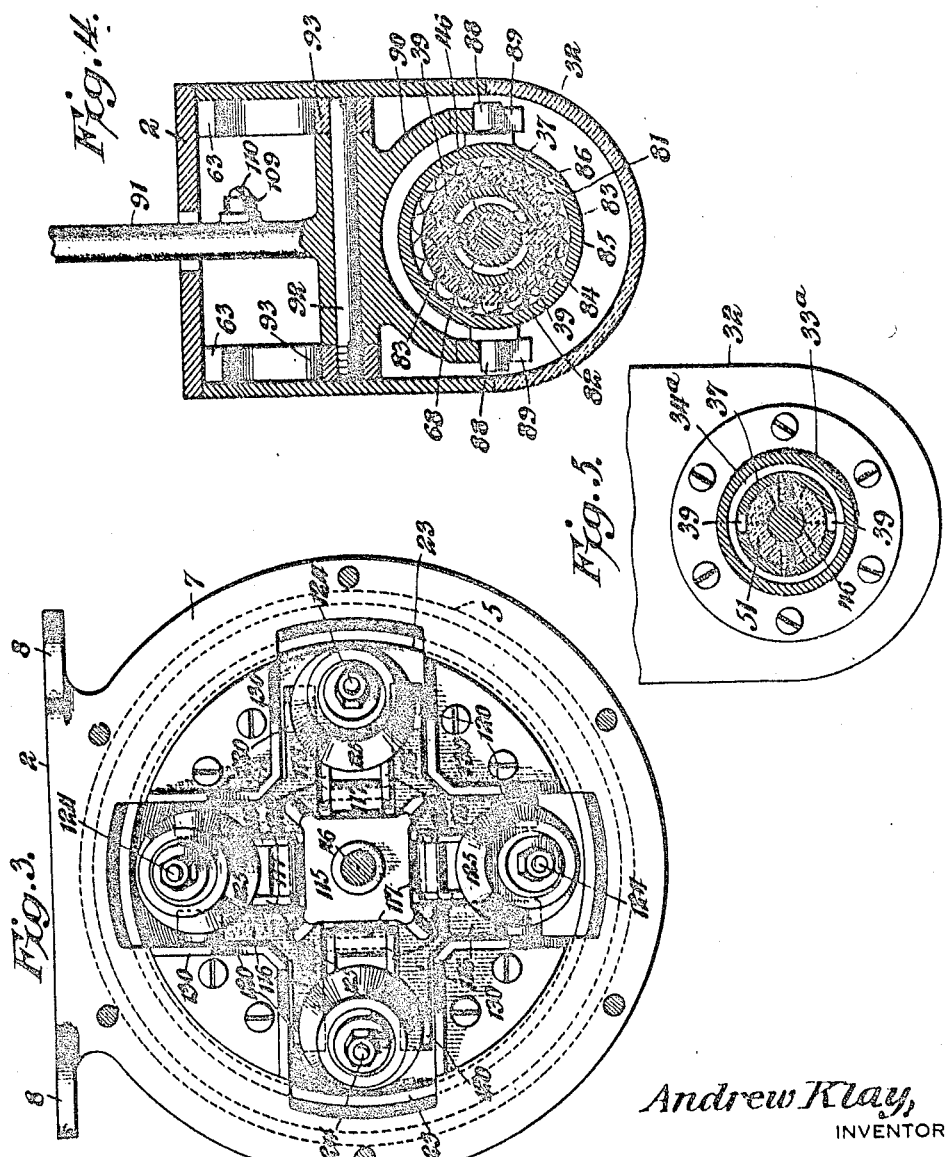

ANDREW KLAY, OF BLUFFTON, OHIO.

VARIABLE-SPEED POWER-TRANSMITTING MEANS.

1,166,838.      Specification of Letters Patent.      Patented Jan. 4, 1916.

Application filed November 11, 1914. Serial No. 871,594.

*To all whom it may concern:*

Be it known that I, ANDREW KLAY, a citizen of the United States, residing at Bluffton, in the county of Allen and State of Ohio, have invented a new and useful Variable-Speed Power-Transmitting Means, of which the following is a specification.

This invention has reference to variable speed power transmitting means, and its object is to provide a simple, light and dust-proof means for the purpose, in which there is no detrimental side thrust or side slipping, and in which all side thrust is so equalized as to save power, while the structure requires but little room to install it and will operate without noise or jerks.

In accordance with the present invention two substantially hemispherical shells are provided with rockable friction means therein so arranged as to impart different rates of speed to the two shells, and the power transmitting members are under the control of levers and intermediate connections, whereby upon a proper manipulation of the levers a variety of speeds is obtainable as well as direct drive and reverse.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a longitudinal section with parts in elevation of a structure embodying the present invention, with the parts arranged for the transmission of power at high speed. Fig. 2 is a view similar to Fig. 1 but showing the position of the parts for transmitting power in reverse, the section being more complete than in Fig. 1. Fig. 3 is an end elevation of the speed varying mechanism with one-half of the casing and the corresponding hemispherical shell removed and the power shaft shown in cross-section, the position of the parts being that illustrated in Fig. 2. Fig. 4 is a section on the line 4—4 of Fig. 2. Fig. 5 is a section on the line 5—5 of Fig. 2.

The power transmitting means of the present invention is designed for use wherever its structure permits. The invention may be used in connection with automobiles in place of the usual transmission gearing thereof, and may also be used on lathes, drill presses, and a variety of other machines. While the invention is shown in a form which makes it particularly adapted for automobiles and for certain other machinery where it is desirable that the structure be operated by hand, certain portions of the structure may be otherwise operated.

In the drawings there is shown a platform 1 which may be taken as indicative of any suitable support for the structure of the present invention. Secured to the platform 1 is a skeleton frame 2 designed to carry the various devices which are associated in the present invention.

There is provided a casing 3 shown in the drawings as composed of two substantially hemispherical members 4, 5, respectively, each formed with an equatorial web 6 applied to opposite faces of a ring 7 carrying ears 8 by means of which the ring is made fast to the frame 2. The shell section 4 is provided with a polar hub 9 through which there is an axle bore constituting a bearing for a shaft 10 which will be considered as the driven shaft. The shaft 10 within the section 4 is enlarged into a head 11 formed with an axial socket 12 and the hub 9 within the section 4 is counterbored as shown at 13 for the reception of a cup 14 housing anti-friction balls 15 against which the head 11 bears. The cup 14 with the anti-friction balls 15 constitutes an anti-friction thrust bearing for the head end 11 of the shaft 10. Furthermore, the inner or terminal end of the head 11 of the shaft 10 is provided with one-way clutch teeth 16 for a purpose which will hereinafter appear. The other member 5 of the casing has a polar hub extension 17 which may be of considerably larger diameter than the hub 9 since it is intended to provide for the passage of certain larger structures than the shaft 10. The inner face of the hub 17 is counterbored in stepped sections 18 and 19, respectively, the latter portion of the counterbore housing a cup 20 containing anti-friction balls 21 for a purpose to be described.

Within the casing 3 are two substantially hemispherical shells 22 and 23, respectively, in concentric spaced relation to the respective casing members 4 and 5. The shell 22 has a polar hub 24 fast on the head 11 of the shaft 10, so as to rotate therewith. The shell 23 has a relatively large area of its polar end dished or countersunk interiorly, as indicated at 25, and this dished portion has a polar extension 26 conforming in part to the countersunk portion 18 of the casing section 5. Carried by the polar extension 26 is a hub-like sleeve 27 projecting toward the equatorial portion of the shell 23. A part 28 of the exterior of the hub 27 is cylindrical and from this portion to the inner end of the hub the exterior surface tapers, as indicated at 29, for a purpose which will presently appear. The interior of the shell 27 is counterbored axially from the outer end as shown at 30, and the hub 17 is formed with a central passage 31 alining with the counterbore 30.

The hub 17 is fast to one side of a box 32 made fast by ears 33 to corresponding ears 34 on the frame 2. That side of the box 32 remote from the side to which the hub 17 is attached carries an elongated bearing member 33ª having that end toward the box counterbored or enlarged to provide a chamber 34ª.

Mounted in the bearing 33ª is a sleeve 35 having an expanded extension 36 within the chamber 34ª and this extension is interiorly threaded for the reception of the corresponding threaded end of a longitudinally extended hollow shaft 37 extending through that wall of the box 32 to which the bearing 33ª is attached, and also through the other side of the box and through the hub 17 and ultimately entering the counterbore 30, being there made fast to the hub 27. Immediately adjacent to the outer end of the hub 27 the shaft 37 is formed with an exterior annular flange 38 engaged by the balls 21 lodged in the cup 20. The shaft 37 therefore carries the shell 23 which rotates with the shaft, while the anti-friction balls 21 constitute an anti-friction thrust bearing for the shell 23. The shaft 37 within the box 32 is provided on diametrically opposite sides with elongated slots 39 provided for a purpose which will presently appear.

Extending longitudinally through the sleeve 35 which is held in the bearing 33 by a set collar 40, is a shaft 41 which may be taken as the power shaft of the structure, and within the expanded portion 36 of the sleeve 35 the shaft 41 is provided with a head 42 acting as a stop member for preventing longitudinal movement of the power shaft in one direction, while a set collar 43 applied to the shaft 41 outside of the sleeve 35 prevents longitudinal movement of the shaft 41 in the other direction. Entering the headed end of the shaft 41 is a longitudinal socket 44 of noncircular shape, preferably square in cross-section, and this socket receives the correspondingly squared end 45 of an intermediate shaft 46 extending entirely through the shaft 37 and to the socket 12 in the head 11 of the shaft 10, where the shaft extension or supplemental shaft 46 is provided with an axial stem extension 47 free to turn in the socket 12. At this point the shaft 46 is formed or provided with a head 48 having one-way clutch teeth 49 thereon facing the clutch teeth 16, and normally out of engagement therewith.

Mounted on the shaft extension 46 close to the squared end 45 thereof is a clutch head 50 having one-way teeth thereon designed to engage corresponding teeth of another clutch head 51 carried by the shaft 37 on its interior and surrounding but free to move on the shaft extension 46. Suitable set screws may be provided for holding these parts in fixed relation to the respective shafts carrying them.

On the shaft extension 46 adjacent to the clutch head 50 are spaced collars 52, 53, respectively, and one or both of these collars may be set collars having suitable set screws for holding them in position. Surrounding the shaft extension 46 between the collars 52 and 53 is a ring 54 provided with diametrically opposite radial pins 55 each extending through a respective slot 39 in the shaft 37. These pins enter a circular channel collar 56 having one web 57 removable, so that the collar may be applied to the pins. This collar 56 is formed on opposite sides with trunnions 57ª engaged by recessed ends 58 of a yoke 59 on one end of a lever 60 having pivot supports 61 in an extended arm 62 of a bracket 63 in turn carried by the frame 2 within the box 32. The lever 60 is wholly contained within the box 32 and at the end remote from the yoke 59 is oppositely beveled as shown at 64 and close to the beveled end the lever carries a laterally projecting pin 65.

The beveled end 64 of the lever 60 has in its path an angle extremity 66 of one end of a leaf spring 67, the other end of which is secured to the frame 2. The spring 67 serves as an elastic stop for the lever 60 constraining it to assume one position or another on opposite sides of the angle extremity 66 of the spring. The lever 60 serves to move the shaft extension 46 lengthwise and this movement is sufficient to engage or disengage the clutch teeth 16 and 49, whereby power from the shaft 41 is transmitted directly to the shaft 10 when the clutch teeth are engaged and is otherwise transmitted when the clutch teeth are not engaged, as will hereinafter appear. The means for causing rocking movements of the lever 60 will also be hereinafter described.

Surrounding the shaft extension 46 between the collar 52 and the head 49, but stopping short of the latter, is a tube 68 slidable lengthwise of the shaft extension 46 and provided near the end adjacent to the collar 52 with a collar 69, while the same end of the tube is threaded and receives a threaded collar 70. Encircling the shaft 37 is a ring 71 having its outer periphery oppositely beveled and this ring is formed with inwardly projecting pins 72 extending through the slots 39 and entering between the collars 69 and 70. Surrounding the ring 71 is a channel ring 73 having one side flange 74 removable, while balls 75 lodged in the channel ring on opposite sides of the ring 71 constitute anti-friction bearings therefor. The channel ring 73 is provided with trunnions 76 engaged by recessed ends 77 of a fork 78 on one end of a manipulating lever 79 fulcrumed by a pin 80 in the arm 62 of the bracket 63.

Entering that end of the hollow shaft 37 remote from the power shaft 41 is another tube 80ª having the end within the shaft 37 reduced in diameter as shown at 81 so as to embrace the tube 68. This reduced end carries a nut 82 spaced from the reduced end of the tube 80ª where there is formed a shoulder. Between the nut 82 and the shoulder at the corresponding end of the tube 80ª pins or lugs 83 engage, these pins extending through the slots 39 from a ring 84 surrounding the shaft 37, this ring being beveled on one face. Surrounding the ring 84 exterior to the shaft 37 is a channel ring 85 between one web of which and the ring 84 is a series of balls 86. The channel ring 85 is entered by a screw ring 87 forming one web of the channel ring and confining the ring 84 and balls 86 therein. The channel ring 85 is provided with trunnions 88 engaging in recessed ends 89 of a fork 90 constituting one end of a manipulating lever 91 fulcrumed by a pin 92 in an arm 93 on the bracket 63.

The lever 79 terminates at the end remote from the fork in a handle 94 provided with a push member 95 extending therethrough and carrying a latch block 96 movable in a slot 97 formed in the body of the lever. The latch block 96 is adapted to engage in any one of a series of notches 98 in an arc strip 99 extending through the lever 79 and at one end pivoted between ears 100 by a pivot pin 101.

The lever 91 has a handle portion 102 and carries a push piece 103 controlling a latch block 104 mounted to slide in a slot 105 in the body of the lever. The lever 79 carries one end of an arc strip 106 connected thereto by a pivot pin 107, and the other end of this arc strip extends through the lever 91 in position to be engaged by the latch block 104, the strip 106 having a notch 108 in position to be entered by the block 104. The lever 91 has one end of a bar 109 pivotally connected thereto by means of a pivot 110 and the other end of this bar extends to and beyond the beveled end 64 of the lever 60. That edge of the bar 109 remote from the spring 67 is formed with notches 111 and 112, the latter being somewhat elongated. These notches are adapted to engage the pin 65 on the lever 60. The lever 79 is provided with a bracket 113 carrying a spring-actuated pin 114 so situated as to engage the bar 109 when the lever 79 is moved in one direction. The end of the tube 68 where it projects beyond the corresponding end of the tube 80ª carries a spider 115 having pairs of matched arms 116. The corresponding end of the tube 80ª is provided with fingers 117 projecting in the direction of the length of the tube each through a pair of matched arms 116.

There is in the particular showing of the drawings a circular series of pairs of arms 116 made up of four pairs disposed ninety degrees apart, but this particular disposition is not obligatory. It is preferred, however, to harmoniously dispose these arms. Mounted between each pair of arms 116 is an elongated block 118 recessed intermediately of its length on opposite sides, as shown at 119, to accommodate the outer ends of the arms 116 carrying the block. These arms have rounded outer ends 120 and the recesses 119 are inversely rounded, as shown at 121, so that the blocks may rock on the rounded ends 120 and at the same time have limited movement lengthwise of the arms for a purpose to be described. Each finger 117 carries on opposite sides a pair of links 122 by one end of each of said links, while the other end of each link is provided with a trunnion 123 entering the corresponding block 118 in the respective recess 119. Each block is longitudinally traversed by a shaft 124 carrying at each end a conoidal friction wheel 125 and between each wheel and the corresponding end of the block 118 anti-friction thrust bearings 126 are introduced.

Mounted on the hub 27 is a plate 127 of spherical segmental form. This plate is held in position by a ring 128 fast on the hub 27, while the portion of the plate 127 where engaging the hub is axially elongated so as to confine anti-friction balls 129 between it and the corresponding portion of the shell 23. The inner surface of the plate 127 has the same curvature as the inner surface of the shell 23 and constitutes a continuation thereof toward the polar end of the plate 23 for a purpose which will presently appear.

Assuming that the shaft 41 is connected to some source of power and that the shaft 10 is connected to some mechanism to be driven either at variable speeds or in a direction of rotation the reverse of that of the power shaft, the operation of the device may be described as follows: While the device is susceptible of a great variety of speed changes, it is customary to provide particularly for a very limited number of speed changes between low speed and high speed, the number of such speeds being usually three, with the reverse of rotation at low speed only. This adapts the structure for the usual automobile use, but it will be understood that for other purposes the number of speed changes may be increased or diminished and it is quite possible to have the changes between low and high speed continuous, wherefore the speed may be set at any desired point between the limits, and changed as much or as little as may be desired. The speed is transmitted through frictional engaging surfaces constituted by the wheels 125 and the inner surfaces of the shells 22 and 23 together with the tapered surface 29 of the hub 27. As it is usual to start mechanisms at low speed, it will be considered that the starting speed is low speed. To start, therefore, the lever 79 is moved so as to engage that notch 98 most remote from the pivot pin 101, and this will be considered as notch No. 1. If the device be installed upon an automobile the lever 79 will in this position be inclined backwardly considering the levers to be generally upright. In this position of the parts or the movement of the lever to such position, has caused the tube 68, which is engaged by the lever through the channel ring 73 and ring 71, to be moved toward the power shaft 41 until the spider 115 has been drawn close to the hub 27, in which position the wheels 125 within the shell 23 are in position to engage the shell close to the plate 127, which plate, as will hereinafter appear, is an idler plate, since it is free to rotate without transmitting power. The wheels 125 within the shell 22 are in position to engage the inner wall thereof. Now the lever 91 is moved away from the lever 79 near which it is assumed to have been located, until the block 104 engages in the notch 108. This has caused a movement of the tube 80ᵃ toward the power shaft 41 and thereby has produced a spreading of the blocks 118 away from the axis of rotation due to the toggle action of the links 122, so that the friction wheels at both ends of each shaft 124 are forced into frictional engagement with the inner surfaces of the respective shells 22 and 23. The power applied to the shaft 41 and causing it to rotate is transmitted to the shaft extension 46 and by way of the clutch members 50 and 51 to the shaft 37, so that the latter is assumed to be rotating and all parts carried thereby participate in such rotation. Ordinarily the clutch members 50 and 51 are in engagement and the clutch teeth 16 and 49 are out of engagement, and the parts are held in this position by the engagement of the lever 60 with the angle end 66 of the spring 67.

If, now, it be desired to increase the speed the lever 79 is moved until it engages in the second notch in order toward the pivot pin 101, the lever 91 following through the connecting bar 106, thus pushing the tube 80ᵃ in a direction to cause the toggle links 122 to follow along with the spider 115 and the blocks 118. The speed is therefore increased gradually by the shifting relation of the friction wheels 125 to the inner spherical surfaces of the shells 22 and 23, wherefore those wheels engaging the inner surface of the shell 23 move from the portion of lesser diameter thereof to the portion of greater diameter, while the reverse takes place with respect to the wheels 125 and the shell 22. These wheels 125 therefore are driven at a greater speed because of the greater diameter of the portion of the shell 23 engaged by them and in turn drive the shell 22 at a greater speed because of the decreasing diameter of the portion of the shell engaged by them, it being understood, of course, that the shell 22 is constantly fast to the driven shaft 10. Now by pushing the lever 91 toward the lever 79 the notch 112 has one end brought into engagement with the pin 65 on the lever 60, so as to rock this lever in a direction to move the shaft extension 46 toward the driven shaft 10, this resulting in disengaging the clutch members 50 and 51 and moving the clutch teeth 49 into engagement with the clutch teeth 16. At the same time, however, the added movement of the lever 91 causes a further projection of the tube 80ᵃ to release the toggle links 122 from the active position, so that the friction wheels 125 no longer frictionally engage the shells 22 and 23. The result of this is that the shaft 41 is directly connected with the shaft 10 and the latter is rotated at the same speed as the shaft 41 thereby providing direct drive.

Suppose now that the highest speed of which the transmission means is capable be desired. The lever 79 is moved toward the pivot pin 101 until it engages in the notch 98 close to said pin. This carries the friction wheels so that those within the shell 23 engage its inner periphery close to the point of largest diameter, while those within the shell 22 are in position to engage its inner periphery as close to the hub 24 as these wheels are designed to be moved. Now by moving the lever 91 into position to force the friction wheels 125 into driving friction engagement with the respective shells 22 and 23, the highest speed of drive is attained. If, however, the levers 79 and 91 have remained in engagement through the link or bar 106 during the movement from low speed through the medium speed to highest speed, the lever 91 does not have to be separately manipulated but the friction wheels remain in engagement during the entire movement of the lever 79 from low to medium to high speed, or from high speed to low speed as the case may be. Suppose, however, it is desired that the driven shaft 10 be rotated oppositely to the direction of rotation of the drive shaft 41. For this purpose the lever 79 has moved as far away from the pivot pin 101 as possible, thus bringing the friction wheels 125 within the shell 23 in position to engage the taper surface 29 of the hub 27, and in this position these wheels will also engage the idler plate 127, so that they are forced firmly into engagement with the hub 27 by the wedging action of the idler plate 127. The lever 91 remaining connected to the lever 79 through the bar or link 106, the friction wheels 125 within the shell 22 are forced into firm frictional engagement therewith. Now power is transmitted by the shaft 41 to the shaft 37 and parts carried thereby and thus causes the hub 27 to rotate in the same direction, the shell 23 being at this time inactive. The wheels 125 are caused to rotate in the opposite direction to that in which they rotate when in engagement with the shell 23, since they are engaged on the diametrically opposite portion from that engaged by the shell 23. Because of this opposite rotation of the wheels 125 the shell 22 is also rotated in the opposite direction to that first considered and, of course, the shaft 10 being fixedly connected thereto participates in such rotation in the opposite direction.

The positions of the parts for highest speed are shown in Fig. 1, while the positions of the parts for reverse are shown in Fig. 2, and it is to be observed that this reverse speed is the lowest speed attained by the device because of the relatively very small diameter of the hub 27, while the wheels 125 within the shell 22 engage the latter at or very close to its point of largest internal diameter.

In order to resist any side strain to which the blocks 118 may be subjected, the ring 7 carries a series of spaced angle brackets 130 projecting into the respective shells 22 and 23, so as to be engaged by the sides of the blocks 118. By this means all side twisting forces are taken up by the brackets 130 and by the main frame of the structure, so that the bearings and slidable shafts of which the tubes 68 and 80ª form part, as well as the spider 115 and toggle links 122 with their supports are relieved from any such burden.

The friction surfaces are made semispherical or so nearly so that they may be considered as semi-spherical, wherefore there is a great range of variation in speed with a material conservation of space. All side thrust is practically eliminated, and there is no side slipping of the friction wheels as their radius always corresponds with the radius of the hemispherical surfaces. Any tendency of side thrust, should such actually exist, is equalized by the provision of eight friction wheels equi-distantly disposed about the respective friction hemispheres, and in this respect the structure differs quite materially from the common disk form of friction drive. Moreover, the hemispherical surfaces provide for a much more extensive friction surface than occurs with the disk type of friction drive, while taking up less room.

The drive of the present invention has advantage over gear drives in being of lighter weight and produces neither noise nor jerks. The drive of the present invention is or may be also absolutely dust-proof, especially with respect to the friction surfaces.

While the shaft 10 has been described as the drive shaft and the shaft 41 as the driven shaft, the order may be reversed. Also, many of the parts described in detail are susceptible of quite marked structural changes without materially affecting their functional characteristics. Therefore the invention is by no means limited in its practical embodiments to close conformity to the structures and particular arrangements shown and described.

What is claimed is:—

1. A variable speed power transmission means comprising a drive shaft, a driven shaft, two alined, opposed and substantially semispherical friction members between and in alinement with the shafts and connected each to a respective one of the shafts, connected friction wheels within and in position to engage said friction members, means for adjusting the friction wheels axially of the friction members, and means for moving the friction wheels into and out of frictional engagement with said friction members.

2. A variable speed power transmission means comprising rotatable drive and driven members, alined, opposed and substantially semispherical friction members on the respective shafts, connected friction devices within the friction members, and means movable axially of the friction members for adjusting the friction devices and moving them into and out of engagement with the friction members.

3. A variable speed power transmission means comprising a rotatable friction drive member and a rotatable friction driven member, connected friction devices in coactive relation to the two friction members for transmitting power from one to the other, means movable axially of the drive and driven friction members for moving the friction devices into different speed relations thereto, and means for moving the friction devices into and out of frictional engagement with the friction members.

4. A variable speed power transmission means comprising a friction drive member of substantially hemispherical form, a friction driven member of substantially hemispherical form in opposed alined relation to the first member, a circular series of connected pairs of friction devices within the friction members with one friction device of each pair individual to one of the friction members and the other friction device individual to the other friction member, a carrier for the series of friction devices movable in the axis of rotation of the friction members for in turn moving the friction devices into different positions of speed relation to the friction members, and other means also movable in the axis of rotation of the friction members for moving the friction devices into and out of frictional engagement with said friction members.

5. A variable speed power transmission means comprising a friction drive member of substantially hemispherical form, a friction driven member of substantially hemispherical form in opposed alined relation to the first member, a circular series of connected pairs of friction devices within the friction members with one friction device of each pair individual to one of the friction members and the other friction device individual to the other friction member, a cirrier for the series of friction devices movable in the axis of rotation of the friction members for in turn moving the friction devices into different positions of speed relation to the friction members, other means also movable in the axis of rotation of the friction members for moving the friction devices into and out of frictional engagement with said friction members, one of the friction members being provided with an axial friction extension in position to be engaged by the friction devices individual to said member, and an idler abutment for said friction devices.

6. A variable speed power transmission means comprising a hollow drive shaft, a substantially semispherical friction member carried thereby, a driven shaft in alinement with the drive shaft, a substantially semispherical friction member carried thereby in opposed alined relation to the first-named friction member, a shaft concentric with the drive shaft and mounted therein and slidable lengthwise thereof, said slidable shaft terminating within the semispherical members, and a series of connected pairs of friction wheels carried by the slidable shaft within the friction members and adjustable by said slidable member toward and from the polar ends of said friction members.

7. A variable speed power transmission means comprising a hollow drive shaft, a substantially semispherical friction member carried thereby, a driven shaft in alinement with the drive shaft, a substantially semispherical friction member carried thereby in opposed alined relation to the first-named friction member, a shaft concentric with the drive shaft and mounted therein and slidable lengthwise thereof, said slidable shaft terminating within the semispherical members, and a series of connected pairs of friction wheels carried by the slidable shaft within the friction members and adjustable by said slidable member toward and from the polar ends of said friction members, said hollow shaft also containing another slidable member terminating within the friction members and provided with toggle connections to the pairs of friction wheels for moving them into and out of frictional engagement with said friction members.

8. A variable speed power transmission means comprising a hollow drive shaft, a substantially semi-spherical friction member carried thereby, a driven shaft, a substantially semi-spherical friction member carried thereby in opposed alined relation to the first-named friction member, a slidable shaft carried by the drive shaft concentric therewith and movable lengthwise thereof, and terminating within the friction members, a circular series of pairs of connected friction wheels carried by the second-named shaft within the friction members and movable by an axial movement of the second-named shaft toward and from the polar and equatorial portions of the friction members, and another shaft within the power shaft in concentric relation thereto and terminating within the friction members, said second-named shaft having toggle connections with the respective pairs of connected friction wheels for moving them into and out of frictional contact with the friction members by an axial movement of said third-named shaft.

9. A variable speed power transmission means comprising a drive shaft, a substantially semispherical friction member carried thereby, a driven shaft in alinement with the drive shaft, a substantially semispherical friction member carried by the driven shaft in opposed alined relation to the first-named friction member, and said driven shaft being also provided with a clutch member within the second-named friction member, a longitudinally slidable shaft extension carrying a clutch member in operative relation to the first-named clutch member and also connected to the drive shaft for rotation thereby, a slidable member carried by the drive shaft and terminating within the friction members, a circular series of connected pairs of friction wheels carried by and in rocking relation to the fourth-named shaft and movable by longitudinal movements of said shaft toward and from the polar and equatorial portions of the friction members, and another shaft movable axially of the drive shaft and terminating within the friction members and there provided with toggle connections with the pairs of friction wheels for moving the latter into and out of frictional engagement with the friction members.

10. A variable speed power transmission means comprising a drive shaft, a substantially semispherical friction member carried thereby, a driven shaft in alinement with the drive shaft, a substantially semispherical friction member carried by the driven shaft and in opposed alined relation to the first-named friction member, and said driven shaft being also provided with a clutch member within the second-named friction member, a longitudinally slidable shaft extension carrying a clutch member in operative relation to the first-named clutch member and also connected to the drive shaft for rotation thereby, a slidable shaft carried by the drive shaft and terminating within the friction members, a circular series of connected pairs of friction wheels carried by and in rocking relation to the fourth-named shaft and movable by longitudinal movements of said shaft toward and from the polar and equatorial portions of the friction members, and another shaft movable axially of the drive shaft and terminating within the friction members and there provided with toggle connections with the pairs of friction wheels for moving the latter into and out of frictional engagement with the friction members, the friction member carried by the drive shaft having an axial friction extension directed toward its equatorial portion, an idler abutment plate mounted on said axial extension in the path of the friction wheels individual to the said first-named friction member when said friction wheels are in engagement with the axial frictional extension, and means for the adjustment of the slidable shafts at the will of an operator.

11. A variable speed power transmission means comprising a hollow drive shaft, a substantially semi-spherical shell mounted on said shaft at one end thereof and constituting a friction member, a driven shaft in alinement with the drive shaft, a substantially semi-spherical shell mounted on the driven shaft in opposed alined relation to the first-named shell, a slidable tubular shaft within the power shaft and concentric therewith and terminating within the friction shells, said last-named shaft there carrying a spider, rockable blocks mounted on the spider and provided with connected friction wheels at opposite ends, another slidable tubular shaft within and concentric to the power shaft and terminating within the friction shells, said last-named tubular shaft having toggle connections with the rockable blocks, and separate means for the adjustment of the tubular shafts axially.

12. A variable speed power transmission means comprising a hollow drive shaft, a substantially semi-spherical shell mounted on said shaft at one end thereof, and constituting a friction member, a driven shaft in alinement with the drive shaft, a substantially semi-spherical shell mounted on the driven shaft in opposed alined relation to the first-named shell, a slidable tubular shaft within the power shaft and concentric therewith and terminating within the friction shells, said last-named shaft there carrying a spider, rockable blocks mounted on the spider and provided with connected friction wheels at opposite ends, another slidable tubular shaft within and concentric to the power shaft and terminating within the friction shells, said last-named tubular shaft having toggle connections with the rockable blocks, and separate means for the adjustment of the tubular shafts axially, said transmission means being further provided with an extension of the power shaft interior thereto and slidable in the direction of its length, said shaft extension having clutch connections with the power shaft and with the driven shaft respectively and having a range of longitudinal movement to couple one or the other of the clutches, and operating means for sliding the shaft extension provided with connections to one of the operating means for the tubular shafts.

13. A variable speed power transmission means comprising a friction drive member of substantially semispherical form, a friction driven member of substantially semispherical form in alined opposed relation to the first-named friction member, connected friction wheels mounted within the friction members, means for adjusting the wheels toward and from the polar and equatorial portions of the friction members, said means being movable in the polar axis of the friction members, other means similarly movable for adjusting the friction wheels into and out of frictional engagement with the friction members, the first-named adjusting means including a manipulating lever for the adjustment of the friction wheels into different speed transmitting relations to the friction members, and the second-named adjusting means including a lever for adjusting the friction wheels into and out of frictional engagement with the friction members, said levers being independently adjustable, and means for connecting the two levers for simultaneous adjustment.

14. A variable speed power transmission means comprising a friction drive member of substantially semispherical form, a friction driven member of substantially semispherical form in alined opposed relation to the first-named friction member, connected friction wheels mounted within the friction members, means for adjusting the wheels toward and from the polar and equatorial portions of the friction members, said means being movable in the polar axis of the friction members, other means similarly movable for adjusting the friction wheels into and out of frictional engagement with the friction members, the first-named adjusting means including a manipulating lever for the adjustment of the friction wheels into different speed transmitting relations to the friction members, and the second-named means including a lever for adjusting the friction wheels into and out of frictional engagement with the friction members, said levers being independently adjustable, and means for connecting the two levers for simultaneous adjustment, the first-named friction member having an axial frictional extension and the lever and adjusting member for the friction wheels having a range of movement to move those friction wheels within the first-named friction member into engagement with the axial frictional extension.

15. A variable speed power transmission means comprising alined opposed semispherical friction shells, one constituting a drive member and the other a driven member, friction connections within and between the two shells, direct driving connections between the two shells and movable into and out of operative position, means movable in the polar axis of the shells for correspondingly moving the friction connections between the two shells into different positions of power transmission, the first-named friction shell having an axial frictional extension for engagement by the friction means within the shell, and means for the adjustment of the friction means within the shells into and out of frictional positions.

16. A variable speed power transmission means comprising a drive shaft, a substantially semispherical friction shell thereon, a driven shaft, a substantially semispherical friction shell thereon in alined opposed relation to the first-named shell, connected friction wheels within the shell in position to transmit power from one shell to the other, a longitudinally movable carrier for the friction wheels mounted in concentric relation to the drive shaft and movable in the direction of the longitudinal axis thereof, another member carried by the drive shaft and movable lengthwise thereof and provided with connections to the friction wheels for moving them into and out of frictional engagement with the shells, separate levers connected to the respective members carried by the drive shaft and movable lengthwise of the latter, an extension of the drive shaft movable into and out of direct driving connection with the driven shaft, a third lever connected to the shaft extension for its longitudinal actuation, connections between one of the first-named levers and the third-named lever for the actuation of the third-named lever in predetermined positions of the first-named lever, and connections between the two first-named levers for the simultaneous or individual adjustment thereof.

17. A variable speed power transmission means comprising a hollow or tubular drive shaft, a substantially semispherical friction shell carried thereby and provided with an axial friction extension directed toward the equatorial plane of the shell, a driven shaft, a substantially semispherical shell mounted thereon in opposed alined relation to the first-named shell, a tubular shaft within the drive shaft and extending beyond the same into the interior of the shells and there carrying a spider, rockable blocks each mounted intermediately upon the spider within the shell and each having connected friction wheels at its opposite ends for engagement with the interiors of respective ones of the two shells, an idler plate at the polar end of the first-named shell within said shell in position to be engaged by respective ones of the friction wheels when the latter are also in engagement with the axial frictional extension of said shell, another tubular shaft within the power shaft and terminating within the friction shells and there provided with toggle connections to the blocks for their adjustment away from and toward the axis of rotation for frictionally connecting and disconnecting the shells by way of the friction wheels, a lever connected to the first-named one of the tubular shafts and movable to adjust the friction wheels toward and from the polar and equatorial portions of the friction shell, another lever connected to the second-named tubular shaft for the action of the toggle connections carried thereby, a shaft extension within the power shaft with oppositely arranged clutch connections with said power shaft and with the driven shaft, a third lever connected to the shaft extension for its longitudinal adjustment, yieldable stop means for the third shaft for holding it in one or the other of its adjusted positions, a link connection between the second and third-named levers for the actuation of the third-named lever by the second-named lever, and connections between the first and second named levers for the action of one by the other, the second-named lever having means for its adjustment independent of the first-named lever.

18. A variable speed power transmission means comprising a hollow or tubular drive shaft, a substantially semispherical friction shell carried thereby and provided with an axial friction extension directed toward the equatorial plane of the shell, a driven shaft, a substantially semispherical shell mounted thereon in opposed alined relation to the first-named shell, a tubular shaft within the drive shaft and extending beyond the same into the interior of the shells and there carrying a spider, rockable blocks each mounted intermediately upon the spider within the shell and each having connected friction wheels at its opposite ends for engagement with the interiors of respective ones of the two shells, an idler plate at the polar end of the first-named shell within said shell in position to be engaged by respective ones of the friction wheels when the latter are also in engagement with the axial frictional extension of said shell, another tubular shaft within the power shaft and terminating within the friction shells and there provided with toggle connections to the blocks for their adjustment away from and toward the axis of rotation for frictionally connecting and disconnecting the shells by way of the friction wheels, a lever connected to the first-named one of the tubular shafts and movable to adjust the friction wheels toward and from the polar and equatorial portions of the friction shell, another lever connected to the second-named tubular shaft for the action of the toggle connections carried thereby, a shaft extension within the power shaft with oppositely arranged clutch connections with said power shaft and with the driven shaft, a third lever connected to the shaft extension for its longitudinal adjustment, yieldable stop means for the third shaft for holding it in one or the other of its adjusted positions, a link connection between the second and third-named levers for the actuation of the third-named lever by the second-named lever, and connections between the first and second named levers for the action of one by the other, the second-named lever having means for its adjustment independent of the first-named lever, the first-named lever being also provided with means disconnecting the second-named lever from the third-named lever.

19. A variable speed power transmission means comprising a hollow or tubular drive shaft, a substantially semispherical friction shell carried thereby and provided with an axial friction extension directed toward the equatorial plane of the shell, a driven shaft, a substantially semispherical shell mounted thereon in opposed alined relation to the first-named shell, a tubular shaft within the drive shaft and extending beyond the same into the interior of the shells and there carrying a spider, rockable blocks each mounted intermediately upon the spider within the shell and each having connected friction wheels at its opposite ends for engagement with the interiors of respective ones of the two shells, an idler plate at the polar end of the first-named shell within said shell in position to be engaged by respective ones of the friction wheels when the latter are also in engagement with the axial frictional extension of said shell, another tubular shaft within the power shaft and terminating within the friction shells and there provided with toggle connections to the blocks for their adjustment away from and toward the axis of rotation for frictionally connecting and disconnecting the shells by way of the friction wheels, a lever connected to the first-named one of the tubular shafts and movable to adjust the friction wheels toward and from the polar and equatorial portions of the friction shell, another lever connected to the second-named tubular shaft for the actuation of the toggle connections carried thereby, a shaft extension within the power shaft with oppositely arranged clutch connections with said power shaft and with the driven shaft, a third lever connected to the shaft extension for its longitudinal adjustment, yieldable stop means for the third shaft for holding it in one or the other of its adjusted positions, a link connection between the second and third-named levers for the actuation of the third-named lever by the second-named lever, and connections between the first and second named levers for the actuation of one by the other, the second-named lever having means for its adjustment independent of the first-named lever, the first-named lever being also provided with means disconnecting the second-named lever from the third-named lever, said means comprising a yieldable engaging pin for moving the link out of engagement with the third-named lever and said link having spaced engaging portions for connection of the link with the third-named lever.

20. In a variable speed power transmission means two alined opposed substantially semispherical friction shells, a circular series of connected axially spaced friction wheels mounted in the friction shells for bodily movement toward and from the polar and equatorial portions of said shells, and means active to the friction wheels for moving them into and out of frictional engagement with the shells.

21. In a variable speed power transmission means, two juxtaposed alined substantially semispherical friction shells, with their equatorial portions adjacent, one constituting a drive member and the other a driven member, a circular series of axially spaced connected pairs of friction wheels within the shells with one wheel of each pair located in one shell and the other wheel in the other shell, a carrier for the series of friction wheels movable axially of the shells for causing the adjustment of the friction wheels toward and from the polar and equatorial portions of the shells, and toggle means within the shells also movable along the axis of rotation for forcing the friction wheels into frictional engagement with the shells and for releasing them from such frictional engagement.

22. In a variable speed power transmission means, two juxtaposed alined substantially semispherical friction shells, with their equatorial portions adjacent, one constituting a drive member and the other a driven member, a circular series of axially spaced connected pairs of friction wheels within the shells with one wheel of each pair located in one shell and the other wheel in the other shell, a carrier for the series of friction wheels movable axially of the shells for causing the adjustment of the friction wheels toward and from the polar and equatorial portions of the shells, and toggle means within the shells also movable along the axis of rotation for forcing the friction wheels into frictional engagement with the shells and for releasing them from such frictional engagement, one of said shells being provided with an inwardly directed axial frictional extension in the path of the friction wheels therein when moved toward the polar end of the shell, and with an idler plate also in the path of said wheels for engagement thereby when in frictional engagement with said polar extension.

23. In a variable speed power transmission means, two juxtaposed alined substantially semispherical friction shells, with their equatorial portions adjacent, one constituting a drive member and the other a driven member, a circular series of axially spaced connected pairs of friction wheels within the shells with one wheel of each pair located in one shell and the other wheel in the other shell, a carrier for the series of friction wheels movable axially of the shells for causing the adjustment of the friction wheels toward and from the polar and equatorial portions of the shells, and toggle means within the shells also movable along the axis of rotation for forcing the friction wheels into frictional engagement with the shells and for releasing them from such frictional engagement, one of said shells being provided with an inwardly directed axial frictional extension in the path of the friction wheels therein when moved toward the polar end of the shell, and with an idler plate also in the path of said wheels for engagement thereby when in frictional engagement with said polar extension, said friction shells being also provided with an inclosing casing carrying journal supports for the respective shells.

In testimony, that I claim the foregoing as my own, I have hereto affixed my signature in the presence of two witnesses.

ANDREW KLAY.

Witnesses:
CHAS. B. LAMBERT,
D. S. FLICK.